(12) United States Patent
Chang et al.

(10) Patent No.: US 10,346,905 B1
(45) Date of Patent: Jul. 9, 2019

(54) FACILITATING FINANCE BASED ON BEHAVIORAL TRIGGERS

(71) Applicant: Wells Fargo Bank, N.A., San Francisco, CA (US)

(72) Inventors: Michael Chang, Millbrae, CA (US); Brian M. Pearce, Pleasanton, CA (US); Daniel Sanford, Charlotte, NC (US); Suzanne Fisi, Clayton, CA (US); John Chuprevich, Davidson, NC (US); Miranda C. Hill, Seattle, WA (US); Traci Nguyen, San Francisco, CA (US); Chris Kalaboukis, San Jose, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 280 days.

(21) Appl. No.: 15/341,343

(22) Filed: Nov. 2, 2016

(51) Int. Cl.
| | |
|---|---|
| *G06Q 30/00* | (2012.01) |
| *G06Q 30/06* | (2012.01) |
| *G06Q 40/02* | (2012.01) |
| *G06Q 40/00* | (2012.01) |
| *G06Q 40/06* | (2012.01) |
| *G06Q 40/04* | (2012.01) |

(52) U.S. Cl.
CPC ............. *G06Q 40/02* (2013.01); *G06Q 40/00* (2013.01); *G06Q 40/04* (2013.01); *G06Q 40/06* (2013.01)

(58) Field of Classification Search
USPC ............... 705/31, 30, 38, 39, 40, 7.29, 7.25; 709/224; 235/379; 370/412
See application file for complete search history.

(56) References Cited

U.S. PATENT DOCUMENTS

| | | | |
|---|---|---|---|
| 6,104,815 A | 8/2000 | Alcorn et al. | |
| 6,490,568 B1 * | 12/2002 | O'Mara | G06Q 20/10 705/38 |
| 7,317,927 B2 | 1/2008 | Staton et al. | |
| 3,028,896 A1 | 10/2011 | Carter et al. | |
| 8,396,455 B2 | 3/2013 | Carlson et al. | |
| 8,478,692 B2 | 7/2013 | Carlson et al. | |
| 8,538,376 B2 | 9/2013 | Lee et al. | |
| 8,571,937 B2 | 10/2013 | Rose et al. | |
| 8,694,633 B2 | 4/2014 | Mansfield et al. | |
| 8,966,392 B2 * | 2/2015 | Antony | G05B 19/41875 345/418 |

(Continued)

FOREIGN PATENT DOCUMENTS

WO   2014190201   11/2014

OTHER PUBLICATIONS

Halgurt Bapierre, Context Specific Next Location Prediction, Technical University of Munich (Feb. 5, 2014).

(Continued)

*Primary Examiner* — Tien C Nguyen
(74) *Attorney, Agent, or Firm* — Merchant & Gould P.C.

(57) ABSTRACT

Systems and methods for facilitating finance by monitoring behavior of users indicative of behavioral patterns or deviations from behavioral patterns and inviting users to make financial changes that may be appropriate based on the monitored behavior. In some embodiments, a minimum amount of relevant data must be collected to support the existence of a behavioral pattern or deviation before a user is invited to make appropriate changes to their finances.

20 Claims, 7 Drawing Sheets

(56) References Cited

U.S. PATENT DOCUMENTS

| | | | |
|---|---|---|---|
| 9,219,668 B2 | 12/2015 | Johnson et al. | |
| 9,324,067 B2 | 4/2016 | Van Os et al. | |
| 9,607,336 B1* | 3/2017 | Dean | G06Q 40/025 |
| 9,785,988 B2* | 10/2017 | Petri | G06Q 30/0609 |
| 2006/0048211 A1* | 3/2006 | Pierson | H04L 63/0876 726/3 |
| 2007/0174448 A1* | 7/2007 | Ahuja | G06Q 10/10 709/224 |
| 2010/0274691 A1 | 10/2010 | Hammad et al. | |
| 2011/0106610 A1 | 5/2011 | Landis et al. | |
| 2011/0106674 A1 | 5/2011 | Perlman | |
| 2011/0191200 A1* | 8/2011 | Bayer | G06Q 20/12 705/26.1 |
| 2012/0023016 A1* | 1/2012 | Roshan Babu | G06Q 20/08 705/40 |
| 2012/0150593 A1* | 6/2012 | Alvin | G06Q 10/087 705/14.1 |
| 2013/0185210 A1 | 7/2013 | Dodson et al. | |
| 2013/0232017 A1 | 9/2013 | Nathanel et al. | |
| 2013/0246272 A1 | 9/2013 | Kirsch | |
| 2014/0279403 A1 | 9/2014 | Baird et al. | |
| 2015/0026057 A1 | 1/2015 | Calman et al. | |
| 2015/0046828 A1 | 2/2015 | Desai et al. | |
| 2015/0073907 A1 | 3/2015 | Purves et al. | |
| 2015/0302383 A1 | 10/2015 | Mills et al. | |
| 2016/0011744 A1 | 1/2016 | Roman et al. | |

OTHER PUBLICATIONS

Geoffrey White, Off the Grid: Pinpointing Location-based Technologies and the Law; The Public Interest Advocacy Centre (Jun. 2015).

Marianne Crowe and Elisa Tavilla, Mobile Phone Technology: "Smarter" Than We Thought: How Technology Platforms are Securing Mobile Payments in the U.S.; Federal Reserve Bank of Boston (Nov. 16, 2012).

* cited by examiner

FACILITATING FINANCE BASED ON BEHAVIORAL TRIGGERS

BACKGROUND

Consumers' financial needs can change for numerous reasons, such as the occurrence of life cycle events relating to family, occupation, or education, as well as the occurrence of large purchases or purchases that require long term financial commitments.

SUMMARY

In accordance with certain aspects of the present disclosure, a system for facilitating finance is provided that infers changes in a user's financial needs based on one or more triggering events, and invites the user to perform one or more financial actions based on the inferred triggering events.

In accordance with certain aspects of the present disclosure, a system for facilitating finance is provided, the system configured to monitor a user's behavior, infer one or more triggering events based on the user's behavior indicating possible changes in the user's financial needs, invite the user to perform one or more financial actions based on the one or more inferred triggering events, and execute one or more financial actions selected by the user in response to the system's inviting.

In accordance with further aspects of the present disclosure, the behavior monitoring takes places over extended periods of time, such as three or more weeks, and a triggering event is not inferred until at least a predetermined threshold amount of relevant data is collected that supports the inference.

In accordance with further aspects of the present disclosure, a triggering event can be a deviation from a pattern of behavior.

In accordance with further aspects of the present disclosure, a triggering event can be a new pattern of behavior.

In accordance with further aspects of the present disclosure, the system monitors behavior through one or more behavior tracking devices, including but not limited to a spending tracking device, a location tracking device, a motion tracking device, a web activity tracking device, and a social media tracking device.

In accordance with further aspects of the present disclosure, the triggers can be one or more of life cycle event triggers, large purchase event triggers, and long term financial commitment event triggers.

In accordance with further aspects of the present disclosure, the financial actions a first user of the system is invited to perform are selected by the system based on financial actions of other users of the system who have one or more attributes in common with the first user, including but not limited socioeconomic attributes.

DETAILED DESCRIPTION

In the following Detailed Description, reference is made to the accompanying drawings, which form a part hereof, and in which is shown by way of illustration specific embodiments which may be practiced. The following detailed description, therefore, is not to be taken in a limiting sense.

Features of the systems and methods for facilitating finance disclosed herein can benefit users of the systems/methods by making users aware of appropriate financial opportunities and changes they may not otherwise have been aware of. For example, people may undergo life cycle or major financial changes in their lives not realizing that those changes warrant a new or modified approach to their financial strategy. In addition, users of the system can have accounts with financial institutions for which revisions or updates to their accounts may be appropriate based on certain life changes, such as an address change, marriage, divorce, or a new child in the family. The system of the present disclosure infers when such financial changes may be appropriate and informs the user about the possible changes and why they may be appropriate. As a result, the users can save money they otherwise would not have saved (e.g., by opening a college savings account for a child), earn money they otherwise would not have earned (e.g., by taking advantage of a geographically-tied interest rate on savings as a result of moving to a new geographical region), avoid missing payments they may otherwise have missed (e.g., by signing the users up for automatic debit payments when entering an agreement requiring periodic payments over a long period of time), and also simplify and reduce the stress associated with making a variety of changes to their existing financial account settings, profiles, and other attributes.

Thus, the various computational components involved in the disclosed system are improved by the features and functionality of the disclosed systems and methods.

Figure 1:
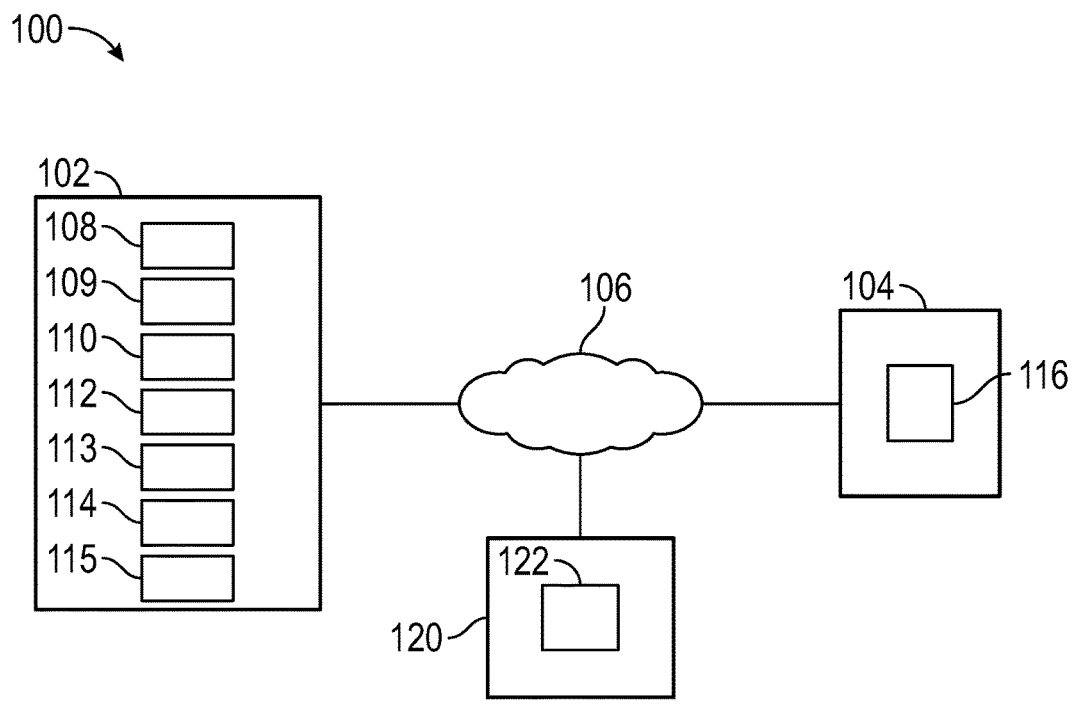
FIG. 1 is a block diagram illustrating an example of a system for facilitating financial transactions in accordance with aspects of the present disclosure.

FIG. 1 is a block diagram illustrating an example of a system 100 for facilitating finance in accordance with aspects of the present disclosure. The system 100 includes a server 102 associated with a financial institution ("FI"), e.g., a bank, and at least one device 104 associated with a user of the system 100. The system 100 will typically have a plurality of users, each of which is associated with a user device. As used herein a user can be any person or any other entity that can be associated with a financial account of the FI. The user device 104 is configured to link to a financial account of the user (e.g., a credit card account, a checking account, a savings account, an investment account) that is associated with the FI. The FI server 102 and the user device 104 interact via a data communication network ("network") 106, e.g., the Internet.

The FI server 102 can include one or more computing devices configured to operate together. The FI server 102 includes one or more databases 108 and one or more modules containing instructions executable by a computer processor, the one or more databases being accessible to the one or more modules. The modules can include, for example, a system subscription module 109, a behavior monitoring module 110, a trigger module 112, a confirmation module 113, an action module 114, and an execution module 115, which will be described in more detail below.

Various functionalities of the finance facilitation system disclosed herein can be carried out by one or more of the specifically enumerated modules disclosed, or alternatively by other modules of the system that may not be explicitly disclosed but are configured to carry out the disclosed functionality. It should also be appreciated that the modules need not be executed by the FI server. For example, the system 100 can include its own dedicated server that executes the various functionality modules and that is not operated or managed by any user of the system or by any financial institution associated with the system, but that users and financial institutions may nevertheless access via the system 100.

The one or more databases 108 contain information about the users of the system 100. For example, the one or more databases 108 can store information about the users, such as their names, addresses, bank account information, spending history, location history, travel history, marital status and other family information, job and income information, or so forth. In some examples, the FI server 102 alternatively or in addition is configured to access such information (when the FI has been given permission to do so) about one or more users of the system via the network 106 from servers and databases outside of the FI, e.g., from servers/databases associated with another financial institution or a social media network. In still further examples, as discussed above, the system 100 can include its own dedicated server. Such a system-dedicated server can be linked to one or more system-dedicated databases that are not operated or managed by any user of the system 100 or by any financial institution associated with the system, but that users and financial institutions may nevertheless access via the system 100. Before access to such information can occur, in some examples the party/server/database from which the information is accessed must first give permission to the financial institution or user of the system 100 to access the information.

As discussed, each of the user devices 104 is associated with a user of the system 100 who holds at least one financial account with the FI, such that funds in that user's account with the FI can be added to or subtracted from by executing actions enabled by the system 100. The user devices 104 can be, e.g., a desktop computer, laptop computer, tablet, personal computer, smart phone, etc., that communicates over the network 106 with the FI server 102 and/or other servers associated with the system 100. It should be appreciated that a single user of the system 100 can be associated with multiple user devices that can be connected to the system 100. The user device 104 includes a user interface 116.

The user interface 116 provides an interacting platform between the user and the system 100, e.g., with the FI server 102 or another server of the system 100. The user interface 116 can provide output provided by, and/or receive input required by, the system's various program modules, such as the behavior monitoring module 110, the trigger module 112, the confirmation module 113, the action module 114, and the execution module 115.

Optionally, the system 100 includes a third party server 120, which can include one or more of its own databases 122. The third party server 120 can be associated with, e.g., a vendor, that provides goods or services to one or more users of the system. The database 122 can store information pertaining to such goods and services and any accounts of the users of the system who purchase them. In some examples, the FI server 102 can access data from and interact (e.g., send and receive instructions) with the third party server 120 via the network 106 in order to coordinate one or more financial actions involving both a user of the system 100 and the third party, e.g., setting up automatic bill pay between a user and the third party vendor.

The system subscription module 109 is configured to sign up users and optionally, third parties, to use the system 100. As discussed, users can be any persons or entities that hold one or more financial accounts with the FI. In addition, users can also include potential holders of accounts with the FI or others who have some relationship with the FI without actually holding a financial account with the FI. Thus, in some examples, a new user of the system 100 can subscribe to the system 100 (thereby becoming a new user) without holding any open financial accounts with the FI, and the system 100 can essentially help the user determine if they would be interested in opening an account with the FI. Third parties can include vendors who provide goods or services to users of the system.

The system subscription module 109 receives information about new users of the system 100, including, e.g., user identifying information (such as a name, address, phone number, facial photograph, email address), other user information (such as marital status, number and age of children, occupation, income), and user permissions (e.g., parameters that permit or deny access to additional information sources, such as social media accounts of the user, location devices associated with the user, motion devices associated with the user, or the user's Internet activity). The system subscription module 109 can create a unique login for the user to access the system 100 from the user's device (e.g., a mobile device) and thereby access the user's account on the system 100. In addition, via the system subscription module 109, the user can link one or more of the user's financial accounts managed by the FI to the system 100, such that the system can draw funds from, deposit funds into, or change information associated with, the user's financial account(s).

In some examples, a user of the system 100 downloads and installs a software application on a user device 104 that electronically links the user device to the system 100, thereby enabling the user to access and process information from the system 100, as well as to enable the system 100 to access information about the user. In addition, once a user logs in to the system 100, the system 100 can access one or more of the user's financial accounts held by the FI in order to draw funds from, deposit funds into, or change information related to, the financial account(s).

The behavior monitoring module 110 is configured to monitor behavior of users of the system 100. In some examples, the system 100 is configured (e.g., by the FI) to monitor specific types of behavior. In addition, in some examples, the user of the system can set permissions (e.g., via the system subscription module 109) about what types of behavior may be monitored by the behavior monitoring module 110. The behavior monitoring module 110 can access behavior information from or more sources of information. Non-limiting examples of information sources include: financial accounts, which can provide information about a user's income and spending and saving behavior; social media accounts, which can provide information about a user's life cycle changes; location devices, which can provide information about a user's location; motion sensing devices, which can provide information about a user's motion; and web browser histories, which can provide information about a user's web browsing.

With respect to financial account information sources, the behavior monitoring module 110 can, e.g., access data from users' financial accounts with the FI. For example, the behavior monitoring module 110 can track deposits and withdrawals into/from users' checking and savings accounts. Certain withdrawals or deposits could be indicative of a new behavior pattern or a deviation from an old behavior pattern. For example, the cessation of automatic deposits from a user's employer into the user's bank account could indicate that the user has lost their job.

With respect to social media accounts, the behavior monitoring module 110 (if the FI is given permission to do so) can follow user profiles and written and pictorial posts and other interactions by the users on their social media accounts and glean information that could be indicative of a new behavior pattern or a deviation from an old behavior pattern. For example, a change in relationship status in a user's social media account from single or "in a relationship" to married could indicate that a user has recently married or is planning to marry in the near future.

With respect to location devices, the behavior monitoring module 110 (if the FI is given permission to do so) can track a user's location and glean information that could be indicative of a new behavior pattern or a deviation from an old behavior pattern. For example, if most of a user's time over the course of an extended period of time is spent in a city other than the one where the user is thought to live, this data could indicate that the user has moved address.

Any suitable positioning device or system used in conjunction with the user device 104 can be accessed by the system 100 and monitored by the behavior monitoring module 110. Non-limiting examples of such positioning devices and systems include, e.g., global positioning systems and devices, cellular tower triangulation, and Internet of Things (IOT) devices, which can be used to track a user device 104 based on its proximity to an object, e.g., a vehicle, or household appliance or other device with known location. Similarly, positioning or motion devices can also detect when IOT devices have moved, which in some cases (such as the case of an Internet router), could indicate a new pattern of behavior, such as moving home. Movement of other IOT devices, in contrast, such as a toothbrush, could be just as likely if not more likely not to indicate a major new behavioral pattern, but rather something less significant such as a vacation or business trip. In some examples, the positioning device locates the user device based on the user device's connectivity to a particular Wi-Fi network, such as at a user's home or office, or the Wi-Fi network available at a store of a third party associated with the third party server 120. For non-mobile user devices 104, the positioning device/system can operate, e.g., by identifying an IP address associated with the user device, or associating the user device with a particular Wi-Fi network or IOT object. In some examples, the location of the user device can be determined when the user logs into, e.g., a social media account.

With respect to motion sensing devices, e.g., a pedometer installed in the user device 104, the behavior monitoring module 110 can obtain data pertaining to other types of behavior patterns or deviations therefrom. For example, data showing that a user who used to walk several miles every day is now walking much less could indicate that the user suffered an injury or underwent surgery. In another example, a motion sensing device could provide data that a user has developed a pattern of driving each from a different address to their office than they used to, suggesting that the user has moved home or moved in with a significant other.

With respect to web browsing histories, the behavior monitoring module 110 can track what websites the user visits and glean information that could be indicative of a new behavior pattern or a deviation from an old behavior pattern. For example, a user's visiting a large number of college enrollment websites and web pages could indicate that the user or someone related to the user (e.g., a daughter or son) is going to enroll in college in the near future.

The behavior monitoring module 110 collects information related to the behavior of the user, which information can be processed by the trigger module 112 to infer one or more changes in the user's financial needs based on the collected behavior information. In some examples, for a given triggering event, the behavior must be monitored for an extended period of time (e.g., three weeks or more) before sufficient data can be collected to support and inference of the triggering event.

In some examples, the trigger module 112 is configured to detect specifically enumerated predefined triggering events (that are, e.g., stored on the database 108) in the collected behavior information of the user(s). For example, the trigger module 112 can be configured to detect a behavior pattern or deviation signifying the triggering event that a user has moved house or is considering moving house. In other examples, the trigger module 112 can be configured to detect behavior patterns or deviations signifying the triggering events that: a user has recently married or divorced; is going to marry or divorce in the near future; has recently had a baby or is going to have a baby in the near future; has a child that will be enrolling in college or graduate school in the near future; may be interested in going on vacation in the near future; has made or is considering making a large financial commitment; has lost a job or may soon lose a job; has sustained a major physical injury or medical operation recently; or has opened an account or made a purchase or may open an account or make a purchase in the near future requiring periodic payments.

To detect a specifically enumerated pattern of behavior or deviation from a pattern of behavior, in some examples the behavior monitoring module 110 needs to have collected sufficient information from which to infer the pattern or deviation. The threshold sufficiency of information required by the trigger module 112 can be quantitative, i.e., at least a predetermined threshold amount of data is required, and/or qualitative, i.e., the cumulative data must reach or exceed a predetermined threshold relevance to the pattern or deviation in question. In addition, the predetermined quantitative and/or qualitative data threshold(s) can vary among specified predetermined behavior patterns and deviations. It should be appreciated that, in some cases, data relevance and quantity are intertwined; that is, the relevance of data increases as the number of its occurrences increases.

For each enumerated behavior pattern or pattern deviation, the system can be configured to assign a relevance value to different types of data blocks, a data block being a discrete pre-defined set of data, such as a user's physical location at a given point in time or over a period of time, or a user's child beginning their final year of high school. Another example data block is a user's large purchase or purchase of a large number (e.g., ten or more) of a particular category of items, such as home goods or furniture, which could indicate that a user is moving address. The system 100 can be dynamic, such that the relevance value of data blocks changes over time as the system 100 learns the predictive strength of particular data blocks. The relevance value of data blocks can be user-specific, or based on collective information across all users of the system or a subset of users of the system, e.g., a subset that has certain attributes (such as socioeconomic or geographic attributes) in common with the user in question.

For example, for a new user of the system 100, initial relevance values can be assigned to that user's data blocks based on collective relevance values ascertained from users system-wide, or from a subset of users who share one or more things in common with the new user, such as living within a predefined distance of the new user, earning approximately the same income as the new user, or having similarly aged children as the new user. Once the initial relevance values are set for the new user, the system 100 can then automatically modify them based on the new user's interactions with the system 100, the relevance values thereby becoming more specific to individual users themselves. It should also be appreciated that the relevance value assigned to one data block can depend on the other data blocks that have been collected by the behavior monitoring module 110. For example, a certain data block may have zero or low relevance in isolation, but substantial relevance in conjunction with the existence of one or more other data blocks.

In addition, in some examples there is a temporal component to the relevance value attached to one or more given data blocks. For example, the relevance value of a data block can decrease as time passes from when the data was collected, reflecting the probability that circumstances or facts pertinent to the triggering event in question have changed since the data was collected.

Other non-limiting examples of factors that can affect the relevance value of a given data block include the time of year the data block is collected, the likelihood that the reason for the data block is attributable to something other than the triggering event in question, the demographics attributable to the customer, or the behavior patterns of a user's friends and family members.

As discussed above, the relevance value assigned to a data block can also be adjusted based on repetition and/or frequency of repetition of the existence of the data block. For example, a data block indicating that a user has visited a single car dealership in the past month may be assigned a low relevance value as far as predicting an automobile purchase by that user, whereas a data block indicating that the user has visited car dealerships on five separate occasions in the past month may be deemed highly relevant, i.e., indicative, that the user is planning to purchase an automobile. It should be appreciated that data blocks can be defined in any number of ways. Thus, in the preceding example, the trigger module 112 can process the user's five car dealership visits as five low relevance events that add up to be highly relevant, or alternatively, as a single event assigned high relevance because of the underlying repetition of the event.

By way of an illustrative example, the system 100 can be configured to assign relevance values (e.g., integer values between negative five and five) to various data blocks in order to infer that a user of the system has moved from City A to a new address in City B. The system 100 assigns a relevance value of zero to a data block indicating that the user's child is seventeen years old, effectively deeming this data block irrelevant, or having zero predictive value, as to whether the user has moved to a new address in City B. The system 100 assigns a relevance value of five to a data bock indicating that the user has spent at least three-quarters of the nights during the past three months at the same address in City B, deeming this data block highly predictive as to whether the user has moved to City B. The system assigns a relevance value of three to a data block indicating that the user has switched sports teams affiliations to a team based in City B, deeming this data block at least moderately predictive as to whether the user has moved to City B. The system assigns a relevance value of negative two to a data block indicating that someone has recently contacted the user via social media expressing relief that the user decided to stay in City A for a while longer, deeming this data block to have negative predictive value of the triggering event that the user has recently moved or will be moving soon to City B.

In some examples, therefore, the trigger module 112 processes data blocks and adds up the relevance values to determine if a triggering event has occurred, each triggering event requiring, in summation, at least the predetermined relevance threshold of collected data.

In addition, it should be appreciated that relevance values can be specific to the triggering event. Thus, a given data block can be more relevant or less relevant depending on the triggering event. For instance, in the preceding illustrative example, although the data block indicating that the user's child is seventeen years old was irrelevant (relevance value of zero) to the triggering event of the user's changing address, that data block could have a positive relevance value to a triggering event of the user having a child that may be attending college in the near future.

In the preceding illustrative example, the system 100 could be configured to detect the triggering event (moving to a new address in City B) when the sum of relevance values attributable to that triggering event is, e.g., greater than or equal to seven. Thus, if at or about a given time $t_1$ the trigger module 112 processes all the data blocks pertinent to the triggering event of the user's moving from City A to City B, and those data blocks include a data block indicating that the user has spent at least three-quarters of the nights during the past three months at the same address in City B and a data block indicating that the user has switched sports teams affiliations to a team based in City B, the sum of those relevance values (five plus three) exceeds the predetermined relevance threshold, thereby triggering the event.

The trigger module 112 can be configured to process data blocks and relevance values continuously, periodically, or in response to pre-determined initiation events or instructions provided by the FI. One example of an initiation event for a given triggering event is the collection of any data block by the behavior monitoring module 110 that carries a positive relevance value for that triggering event. Another example of an initiation event is a single data block having a pre-assigned relevance value at or above the predetermined threshold needed to trigger the triggering event. For example, a social media post by a user of the system 100 stating their child will be starting college as a freshman in one month's time can initiate the trigger module 112 to process the data block associated with that social media post in connection with the trigger event of a child going to college or graduate school, the data block carrying sufficient relevance value to trigger the event all by itself.

As discussed, relevance values of data blocks can be specific to the triggering event. Thus, the trigger module 112 can be configured to identify different triggering events individually by processing data blocks on a triggering event by triggering event basis. In addition, the system 100 can be configured with a predefined set of enumerated triggering events for the trigger module 112 to detect. The predefined triggering events can be more or less specific than the examples provided in this disclosure. For example, a triggering event can be "change of address" and a more specific version of that triggering event can be "change of address to City B."

As discussed, triggering events can include new behavior patterns or changes to preexisting behavior patterns that suggest a user's financial needs may be changing. Non-limiting examples of triggering events include: moving home; buying a new home; moving in with another person, e.g., a significant other; a child going to college or graduate school; a new child in the family; losing a job; starting a new job; getting married; getting divorced or separated from a spouse; retiring; partially retiring (e.g., changing from full-time to part-time employment); making a large purchase (e.g., for an automobile, a boat, a large animal such as a horse, a large medical expense such as surgery); or making a purchase requiring periodic bill payment over time.

The confirmation module 113 is an optional module configured to confirm with the user that an inferred triggering event (i.e., a new behavior pattern or deviation from a previous behavior pattern) has actually occurred. In some examples, the confirmation module 113 is configured to generate one or more questions that the user can answer via the user device 104. By answering the one or more questions generated by the confirmation module, the user can effectively confirm that the inferred triggering event has or has not occurred. For example, if the trigger module 112 infers a triggering event that a user of the system 100 has moved in with another person, the confirmation module can cause the user device 104 to display a confirmation question, such as asking the user if they have recently moved in with another person. Via the user device 104, the user can then submit an answer to the question confirming or disconfirming the inferred triggering event.

The action module 114 generates one or more financial actions that a user of the system 100 can perform based on triggering events (i.e., new behavior patterns or deviations from previous behavior patterns) detected by the trigger module 112, and present those one more actions to the user via the user device 104 as executable financial action options. In some examples, prior to generating the financial action options, the action module 114 can cause the system 100 to learn more about the user's specific needs related to the triggering event, in order to better tailor the financial action options that are generated.

Non-limiting examples of actions that may be appropriate and therefore generated by the action module 114 depending on the type of triggering event include: 1) filling out and submitting a change of address form for one or more financial accounts, and associated actions; 2) opening a new financial account, e.g., a shared bank account or a college savings account, and associated actions; 3) updating the FI's stored personal information about the user, e.g., the user's employer information, and associated actions; 4) setting up a payment sharing plan (e.g., with a new roommate or significant other), and associated actions; 5) closing out one or more financial accounts and distributing the funds, and associated actions; 6) setting up automatic bill payments to a vendor, and associated actions.

Associated actions, as used herein, can include, for example, suggesting and setting a meeting with a financial adviser (i.e., an employee of the FI), offering additional, related financial products to the user, and so forth.

The execution module 115 processes and executes the user's execution of the one or more financial actions generated by the action module 114 and selected by the user via the user device 104. In some examples, the execution module 115 is also configured to process a user's declining to execute any of the financial actions generated by the action module 114. For example, in response to receiving an instruction from the user via the user device 104 that no financial actions are to be performed, the execution module 115 can inform the system 100 accordingly, effectively terminating and/or deleting the relevant inferred triggering event.

Figure 2:
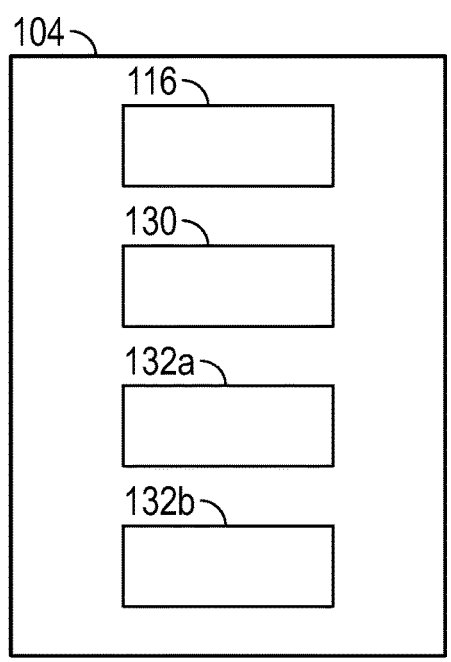
FIG. 2 is a block diagram illustrating an example user device that can be used in the system of FIG. 1.

FIG. 2 is a block diagram illustrating more details of the example user device 104 that can be used in the system 100 of FIG. 1. In the example, the user device 104 includes the user interface 116 as described above. In this example, the user device 104 includes an input device 130 and a plurality of behavior tracking devices 132a and 132b.

The user interface 116 allows the user to interface with the system 100, e.g., to answer questions, input information, receive triggering event notifications, and execute financial actions.

The input device 130 allows the user to input information or instructions that can be sent to the system 100 via the network 106. For example, the input device 130 can be a touch user interface display screen, a voice command interface, a keyboard, a mouse, or another type of input device installed on the user device 104.

The user device 104 can include any number of behavior tracking devices. In the example user device 104 of FIG. 2, the user device 104 includes two behavior tracking devices 132a and 132b. A behavior tracking device can be any piece of hardware and/or software installed on the user device 104 that can inform the system 100 (via the network 106) about a user's behavior patterns or deviations therefrom. Non-limiting examples of behavior tracking devices include social media software applications, Bluetooth®, web history trackers, global positioning devices, pedometers, and other devices that determine the location of the user device 104 by Wi-Fi network proximity.

The user device 104 is configured to transmit behavior pattern information from the one or more behavior tracking devices (132a, 132b, etc.) via the network 106 to the FI server 102.

In some examples, one or more features of the system 100 become available only when enabled by the individual user of the system 100. For example, a user may have to open and/or login to a system account residing on the database 108 or to a particular software application residing on the user device 104 in order for the FI server 102 to interact with the user device.

Figure 3:
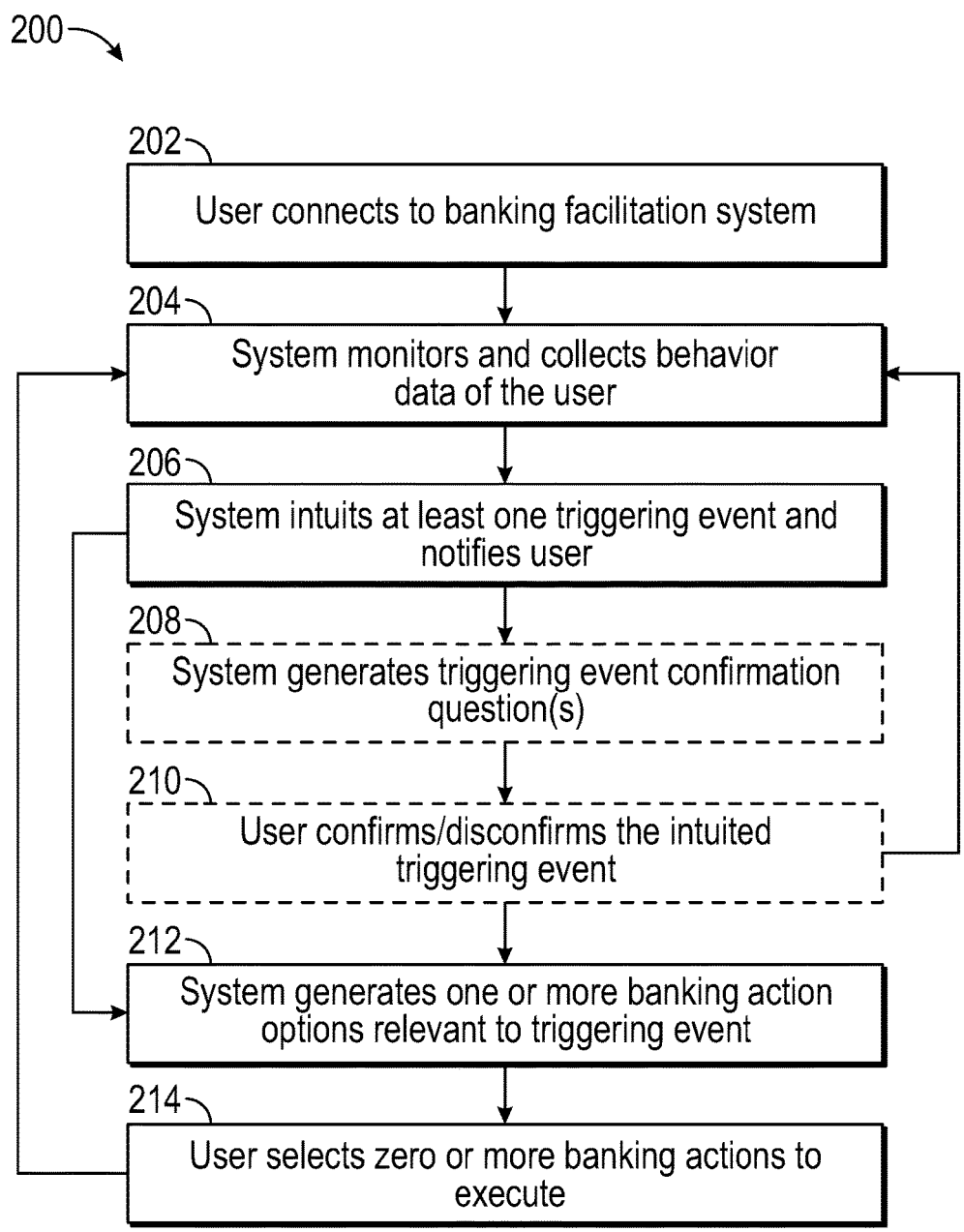
FIG. 3 is a flow diagram illustrating an example of a process implemented by the system of FIG. 1.

FIG. 3 is a flow diagram illustrating an example of a behavioral trigger financial process 200 implemented by the system 100 of FIG. 1.

In a step 202, a user connects to the finance facilitation system 100 of the FI, e.g., by downloading a software application onto their user device and setting up a finance facilitation account (i.e., a user account) with the system 100, establishing settings, permissions, preferences, and the like. Authentication credentials, e.g., a login name and password, security questions, etc., can be established to mitigate the chances of unauthorized access to the system 100 through the user's finance facilitation account. The user account is linked to at least one financial account of the user (e.g., a credit card account or bank account). The financial account can be provided by the FI. As part of the step 202, the user can set permissions that link/provide access of the FI server 102 to one or more information sources, e.g., social media accounts held by the user, location devices, etc., to permit the system 100 to monitor the user's behavior.

In a step 204 the behavior monitoring module 110 monitors the user's behavior and collects data blocks related to the user's behavior over time.

In a step 206, the trigger module 112 processes collected data blocks and infers at least one triggering event corresponding to a behavior pattern or a deviation from a behavior pattern of the user, and notifies the user, e.g., by causing the user device 104 to display a notification that it has inferred a triggering event.

In an optional step 208, one or more confirmation questions generated by the confirmation module 113 are presented to the user via the user device 104 to confirm or disconfirm the occurrence of the inferred triggering event.

In an optional step 210, the user confirms or disconfirms the inferred triggering event.

If the user disconfirms the inferred triggering event, the process 200 reverts to the step 204. If the user confirms the triggering event, in a step 212, one or more financial actions relevant to the triggering event are generated by the action module 114 and presented to the user via the user device 104. The user can choose to execute zero or more of the presented financial actions.

If the user elects to execute zero of the financial actions, the process 200 reverts to the step 204. If the user elects to execute one or more of the financial actions, in a step 214 the one or more financial actions are executed by the execution module 115. As discussed above, execution of the one or more financial actions can require additional interactions and/or information provision from the user before those actions are completed.

It should be appreciated that multiple iterations of the process 200 for the same user can run simultaneously, each iteration of the process 200 corresponding to a different triggering event. For example, one iteration of the process 200 can mine data related to a possible address move of the user, while another iteration of the process 200 can mine data related to the user's starting a new job.

FIGS. 4A-4D are example user interface displays showing user input screens on the user interface 116 of the user device 104 of FIG. 1. These user interface displays can be displayed to the user on the user device 104 in conjunction with the process 200 described above. In some examples, these displays are generated when the process 200 utilizes the steps 206, 208, 210, 212, and 214. Thus, the user interface displays of FIGS. 4A-4D can be implemented following the system's inferring of a triggering event. The inferred triggering event at play in FIGS. 4A-4D is a change of address into a shared living space (e.g., with a roommate or significant other).

Figure 4A:
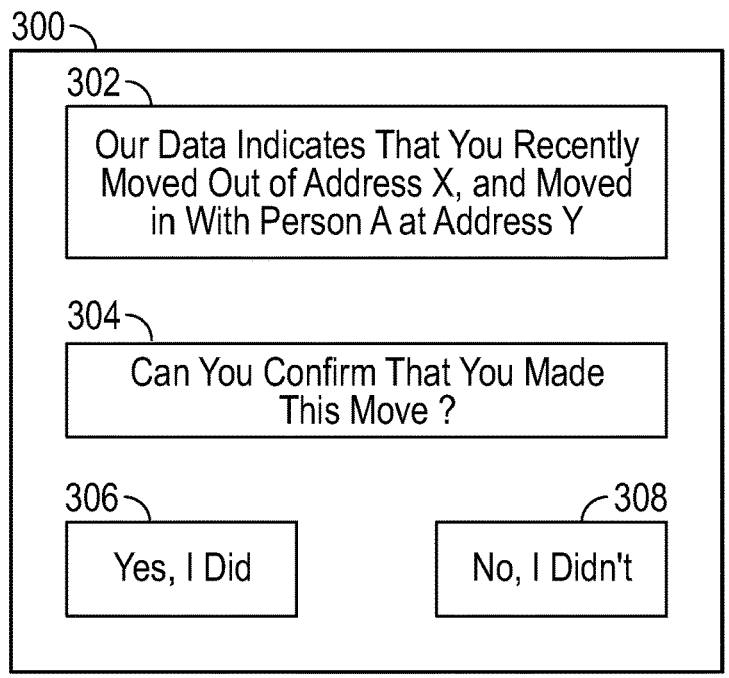
FIG. 4A is an example user interface display showing an example user input screen in accordance with the system of FIG. 1.

In FIG. 4A, the user interface display 300 includes a notification 302 that the system has inferred a behavior pattern/deviation triggering event that the user has changed address and moved in with another person.

The user interface display 300 also includes a confirmation question 304, and selectable options 306 and 308 allowing the user to confirm or disconfirm the inferred triggering event by answering the confirmation question 304.

Figure 4B:
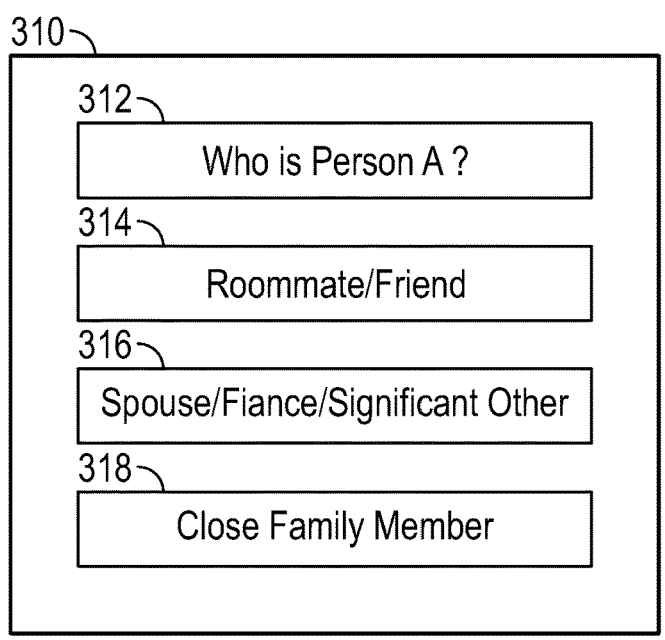
FIG. 4B is another example user interface display showing an example user input screen in accordance with the system of FIG. 1.

FIG. 4B shows an example user interface display 310 that can be displayed on the user's device 104 if the user confirms the triggering event by selecting the option 306 in FIG. 4A. FIG. 4B includes one or more questions 312, the answer(s) to which can assist the system in generating appropriate financial actions for the user in question and the triggering event in question. In this example, the question 312 posed relates specifically to the triggering event and asks the user to identify the type of person they have moved in with. In this example, the user interface includes selectable options 314, 316, and 318 for answering the question, though it should be appreciated that other forms of data entry (e.g., a free form data entry field) would also be appropriate for answering the question(s). Once the user has submitted an answer to the question 312, the system can generate further information gathering questions and/or move on to generating appropriate financial actions.

Figures 4C, 4D:
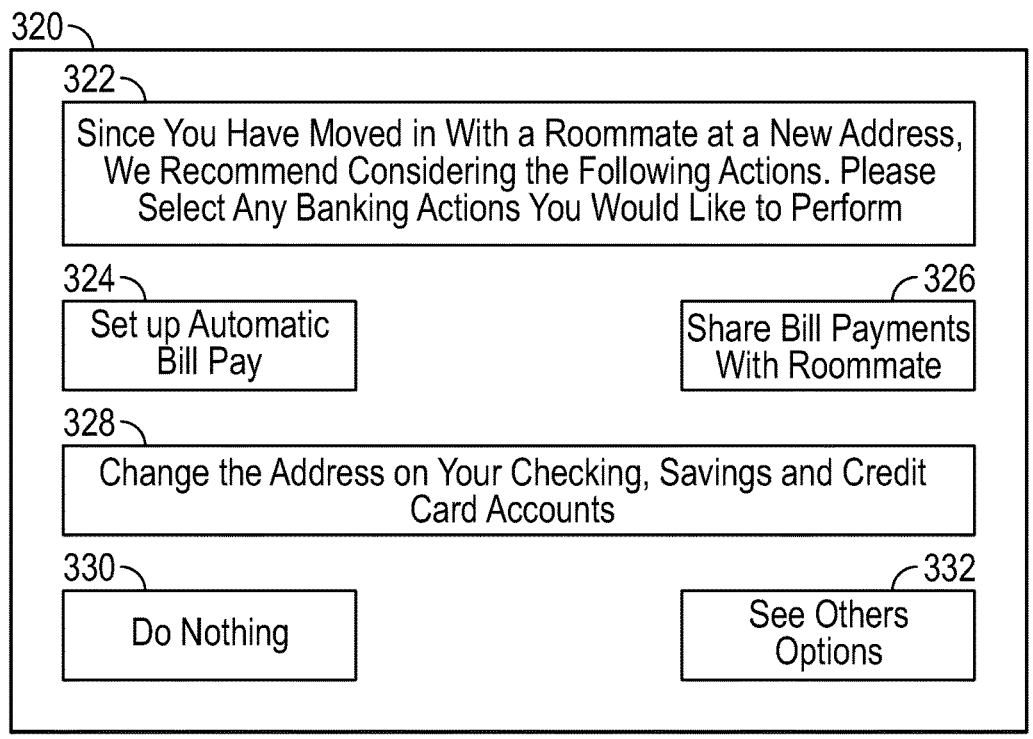
FIG. 4C is another example user interface display showing an example user input screen in accordance with the system of FIG. 1.
FIG. 4D is another example user interface display showing an example user input screen in accordance with the system of FIG. 1.

FIG. 4C shows an example user interface display 320 that can be displayed on the user's device 104 after the user selected the option 314 from the user interface display 310. The user interface display 320 includes an invitation 322 for the user to perform one or more selectable financial actions 324, 326, and/or 328 that may be appropriate as a result of the triggering event. The user interface display 320 also includes the selectable option 330 to perform no financial actions, and a selectable option 332 which prompts the system 100 to generate and pose to the user additional selectable financial actions related to the triggering event. It should be appreciated that the selectable financial actions can be specifically tailored based on information known about the specific user. For example, the selectable option 328 can mention only changing the address on a checking account, if the user does not have a savings account or credit card account with the FI.

If the user ultimately elects to perform one or more financial actions, follow-on user interface displays can perform any steps required to complete those actions. One such example user interface 340 is shown in FIG. 4D, which could be a user-interface following the user's selection of the selectable option 326 and, e.g., after the user identifies which bill payments they would like to share with their roommate and the percentage each party will be contributing to the payments. The user interface 340 includes a prompt 342 asking the user to provide information about their new roommate, as well as data fields 344, 346, and 348 for the user to enter that information, and a submission button 350 for submitting the information to the system 100 after it has been entered.

Figures 5A, 5B:
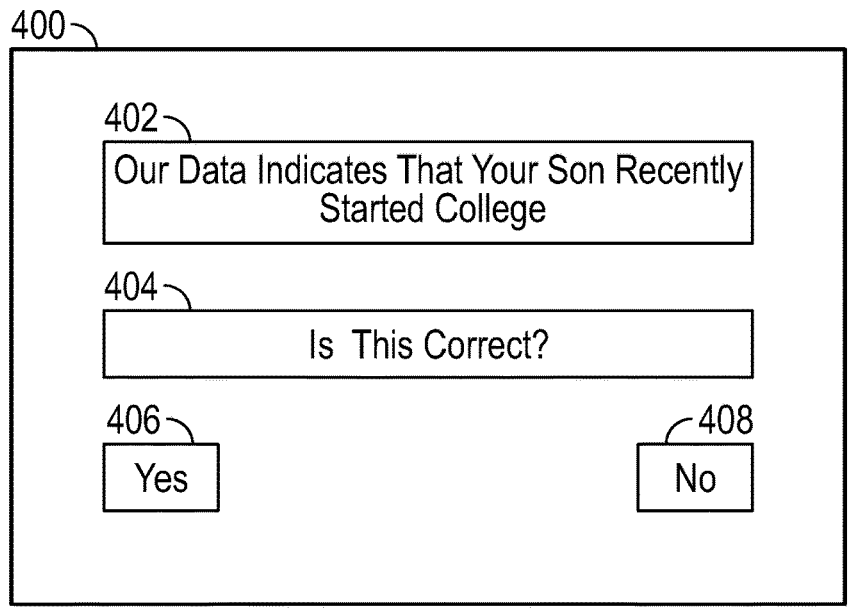
FIG. 5A is another example user interface display showing an example user interface screen in accordance with the system of FIG. 1.
FIG. 5B is another example user interface display showing an example user input screen in accordance with the system of FIG. 1.
Figure 5C:
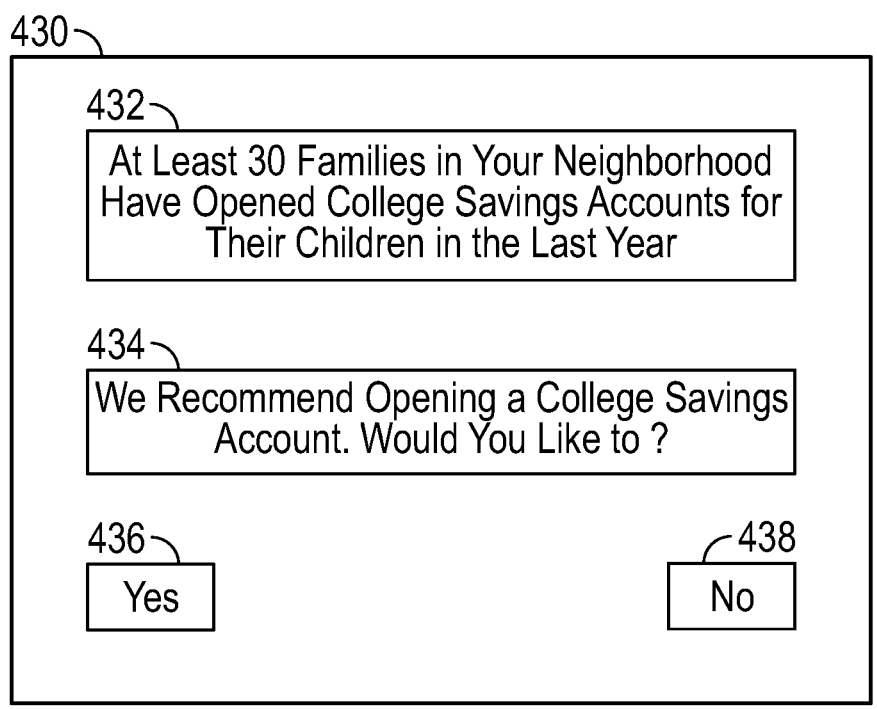
FIG. 5C is another example user interface display showing an example user input screen in accordance with the system of FIG. 1.

FIGS. 5A-5C illustrate further example user interface displays showing user input screens on the user interface 116 of the user device 104 of FIG. 1. These user interface displays can be displayed to the user on the user device 104 in conjunction with the process 200 described above. In some examples, these displays are generated when the process 200 utilizes the steps 206, 208, 210, 212, and 214. Thus, the user interface displays of FIGS. 5A-5C can be implemented following the system's inferring of a triggering event. The inferred triggering event at play in FIGS. 5A-5C is the user's child's starting college.

In FIG. 5A, the user interface display 400 includes a notification 402 that the system has inferred a behavior pattern/deviation triggering event that the user's son has started college.

The user interface display 400 also includes a confirmation question 404, and selectable options 406 and 408 allowing the user to confirm or disconfirm the inferred triggering event by answering the confirmation question 404.

FIG. 5B shows an example user interface display 410 that can be displayed on the user's device if the user confirms the triggering event by selecting the option 406 in FIG. 5A. FIG. 5B includes one or more questions 412 and 414 the answer(s) to which can assist the system 100 in generating appropriate financial actions for the user in question and the triggering event in question. In this example, the questions 412 and 414 posed relate specifically to the triggering event and ask the user to provide information about how their son's college education is to be financed. In this example, the user interface includes data fields 416 and 418 for answering the questions, though it should be appreciated that other forms of data entry (e.g., selectable options) would also be appropriate for answering the question(s). Once the user has submitted an answer to the questions 412 and 414 (e.g., via the submit button 420), the system can generate further information gathering questions and/or move on to generating appropriate financial actions.

FIG. 5C shows an example user interface display 430 that can be displayed on the user's device after the user has entered all required information surrounding the triggering event in question. In this example, the user interface display 430 includes an explanation 432 as to why a particular financial action is recommended in view of the triggering event in question. In this example, the explanation 432 was generated by the system as a result of its data mining, e.g., via the behavior monitoring module 110, of other users of the system 100 who may be in the same or similar socio-economic group as the user based on residence neighborhood proximity, annual income, etc. The user interface display 430 includes an invitation 434 to execute the recommended financial action (opening a college savings account), and selectable options 436 and 438 to execute or not to execute the recommended financial action. If the user opts to execute the recommended financial action, follow-on interface displays 430 can perform any steps required to complete the action, in this case, to open the college savings account with the FI.

Figure 6:
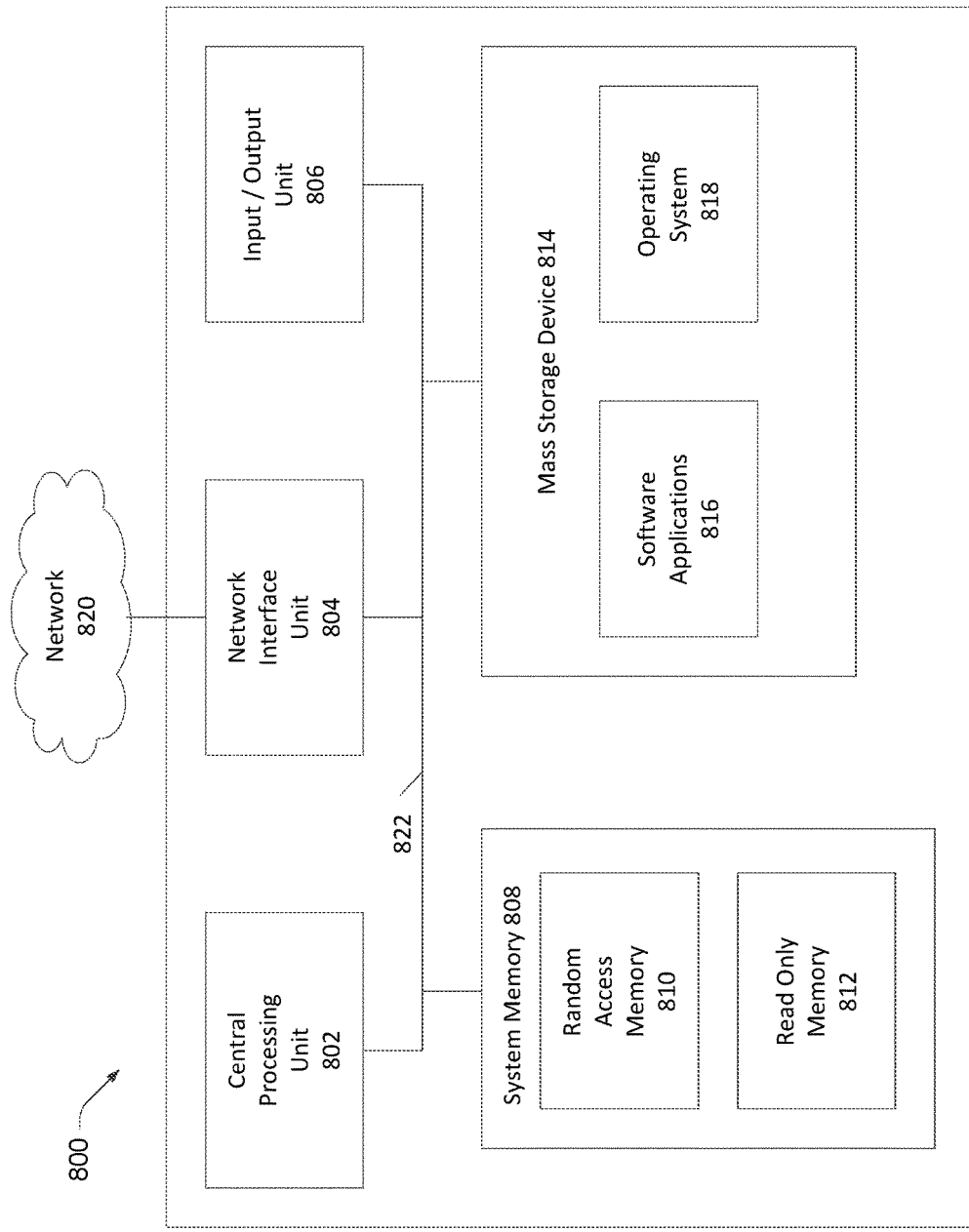
FIG. 6 is a block diagram illustrating portions of an example computer system of the system of FIG. 1.

FIG. 6 schematically illustrates an example computer system suitable for implementing aspects of the system 100 illustrated in FIG. 1, such as the FI server 102, the third party server 120, and/or the user device 104. The modules, databases, and other components of these servers and devices could all be implemented on a common computer system, or the various components could be implemented on one or more separate computer systems that are accessible by one another. The computer 800, which may be a server computer, for example, includes at least one central processing unit ("CPU") 802, a system memory 808, and a system bus 822 that couples the system memory 808 to the CPU 802. The system memory 808 includes a random access memory ("RAM") 810 and a read-only memory ("ROM") 812. A basic input/output system that contains the basic routines that help to transfer information between elements within the server computer 800, such as during startup, is stored in the ROM 812. The computer 800 further includes a mass storage device 814. The mass storage device 814 is able to store software instructions and data. One or more of the databases (e.g., the database 108) of the system could be implemented by the mass storage device 814, or one or more of the databases could be implemented by other computer systems accessible by the computer 800.

The mass storage device 814 is connected to the CPU 802 through a mass storage controller (not shown) connected to the system bus 822. The mass storage device 814 and its associated computer-readable data storage media provide non-volatile, non-transitory storage for the server computer 800. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server computer 800.

According to various embodiments, the server computer 800 may operate in a networked environment using logical connections to remote network devices (such as the others of the FI server 102, the user device 104, and the third party server 120) through the network 820, such as a wireless network, the Internet, or another type of network. The server computer 800 may connect to the network 820 through a network interface unit 804 connected to the system bus 822. It should be appreciated that the network interface unit 804 may also be utilized to connect to other types of networks and remote computing systems. The server computer 800 also includes an input/output controller 806 for receiving and processing input from a number of other devices, including the user interface 116 generated on the user device 104 which could include a touch user interface display screen, or another type of input device, as described above. Similarly, the input/output controller 806 may provide output to a touch user interface display screen or other type of output device.

As mentioned briefly above, the mass storage device 814 and the RAM 810 of the server computer 800 can store software instructions and data. The software instructions include an operating system 818 suitable for controlling the operation of the server computer 800. The mass storage device 814 and/or the RAM 810 also store software instructions, that when executed by the CPU 802, cause the server computer 800 to provide the functionality of the server computer 800 discussed in this document. For example, when the server computer 800 corresponds to the FI server 102, the mass storage device 814 and/or the RAM 810 can store software instructions that, when executed by the CPU 802, cause the server computer 800 to implement the system subscription module 109, the behavior monitoring module 110, the trigger module 112, the confirmation module 113, the action module 114, the execution module 115, and any other modules incorporated to perform the various functionalities described.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A system for facilitating one or more financial actions, the system comprising:
   a plurality of positioning devices, each respective positioning device of the plurality of positioning devices having a known location and a proximity sensor to track mobile devices based on proximity of the mobile devices to the respective positioning device;
   at least one processor; and
   memory encoding instructions that, when executed by the at least one processor, causes the at least one processor to:
     monitor a user's behavior over a period of time in connection with one or more predefined triggering events, the one or more predefined triggering events comprising a new behavior pattern or a deviation from a previous behavior pattern and being selected from: personal relationship changes of the user; employment changes of the user or a family member of the user or a person living with the user; residence changes of the user or a family member of the user or a person living with the user; new purchases that exceed a predefined threshold purchase amount; and new purchases that require multiple payments over time, wherein monitoring the user's behavior over the period of time in connection with the one or more predefined triggering events includes to:
       collect a plurality of location data blocks over the period of time, each respective location data block storing the user's physical location at a point in time based on monitoring the plurality of positioning devices to track a mobile device associated with the user over the period of time based on proximity of the mobile device associated with the user to one or more of the plurality of positioning devices; and
       assign, to each respective location data block of the plurality of location data blocks, a respective relevance value indicating a predictive value of the respective location data block in connection with at least one of the one or more predefined triggering events;
     infer, based on data collected from the monitoring, an occurrence of at least one of the one or more predefined triggering events responsive to a sum of relevance values of the plurality of location data blocks collected in connection with the at least one of the one or more predefined triggering events that meets or exceeds a predefined threshold relevance value;
     notify the user of the at least one inferred triggering event;
     invite the user to take one or more financial actions related to the at least one inferred triggering event; and
     in response to a selection of the user to take at least one of the one or more financial actions, execute at least one of the one or more financial actions.

2. The system of claim 1, wherein, before the invite, the instructions cause the at least one processor to generate one or more confirmation questions and process answers of the user to the one or more confirmation questions confirming or disconfirming the at least one inferred triggering event.

3. The system of claim 1, wherein the one or more financial actions are selected from: changing information regarding one or more financial accounts of the user; setting up automatic bill payments; sharing bill payments; and opening one or more financial accounts.

4. The system of claim 1, wherein the one or more financial actions the user is invited to take are determined partially based on information received from the user about the at least one inferred triggering event after the user is notified about the at least one inferred triggering event.

5. The system of claim 1, wherein the instructions cause the at least one processor to identify a socioeconomic group associated with the user, and wherein the one or more financial actions the user is invited to take are determined partially based on financial actions taken by one or more people in the socioeconomic group other than the user.

6. The system of claim 1, wherein the user's behavior is monitored using one or more tracking devices selected from: motion tracking devices; web activity tracking devices; spending tracking devices; and social media tracking devices.

7. The system of claim 1, wherein monitoring the user's behavior over the period of time in connection with the one or more predefined triggering events further includes to:
   decrease a relevance value of at least one of the plurality of location data blocks over the period of time; and
   adjust a relevance value of at least one of the plurality of location data blocks based on a repetition of the existence of the third location data block.

8. The system of claim 1, wherein monitoring the user's behavior over the period of time in connection with the one or more predefined triggering events further includes to:
   modify a relevance value of at least one of the plurality of location data blocks based on a new interaction by the user, thereby increasing the specificity of the second location data block.

9. A computer implemented method, comprising:
   monitoring a user's behavior over a period of time in connection with one or more predefined triggering events, the one or more predefined triggering events comprising a new behavior pattern or a deviation from a previous behavior pattern, the monitoring comprising:
     collecting data blocks in connection with the one or more predefined triggering events, wherein each of the data blocks is assigned a relevance value between a negative number and a positive number, the relevance value indicating a predictive value of a data block in connection with at least one of the one or more predefined triggering events, wherein collecting the data blocks includes:
       collecting a plurality of location data blocks over the period of time, each respective location data block of the plurality of location data blocks storing the user's physical location at a point in time based on monitoring a plurality of positioning devices to track a mobile device associated with the user over the period of time based on proximity of the mobile device associated with the user to one or more of the plurality of positioning devices; and
       assigning, to each respective location data block of the plurality of location data blocks, a respective relevance value indicating a predictive value of the respective location data block in connection with at least one of the one or more predefined triggering events;

inferring, based on the data blocks collected from the monitoring, an occurrence of at least one of the one or more predefined triggering events based on a sum of reference values of the data blocks meeting or exceeding a threshold;

notifying the user of the at least one inferred triggering event;

inviting the user to take one or more financial actions related to the at least one inferred triggering event; and in response to a selection of the user to take at least one of the one or more financial actions, executing at least one of the one or more financial actions.

10. The method of claim 9, wherein the one or more predefined triggering events are selected from: personal relationship changes of the user; employment changes of the user or a family member of the user or a person living with the user; residence changes of the user or a family member of the user or a person living with the user; new purchases that exceed a predetermined threshold purchase amount; and new purchases that require multiple payments over time.

11. The method of claim 9 wherein the inferring occurs when a sum of relevance values of the data blocks collected in connection with a first of the at least one inferred triggering event meets or exceeds a predefined threshold relevance value for the first of the at least one triggering event.

12. The method of claim 9, further comprising:
generating one or more confirmation questions; and
processing answers of the user to the one or more confirmation questions confirming or disconfirming the at least one inferred triggering event,
wherein the generating of the one or more confirmation questions and the processing of the answers are performed before the inviting.

13. The method of claim 9, wherein the one or more financial actions are selected from: changing information regarding one or more financial accounts of the user; setting up automatic bill payments; sharing bill payments; and opening one or more financial accounts.

14. The method of claim 9, wherein the one or more financial actions of the inviting step are determined partially based on information received from the user about the at least one inferred triggering event after the notifying step.

15. The method of claim 9, further comprising:
identifying a socioeconomic group associated with the user,
wherein the one or more financial actions the user is invited to take are determined partially based on financial actions taken by one or more people in the socioeconomic group other than the user.

16. A non-transitory computer-readable data storage medium storing instructions that, when executed by a processor, cause the processor to:
monitor a user's behavior over a period of time in connection with one or more predefined triggering events, the one or more predefined triggering events comprising a new behavior pattern or a deviation from a previous behavior pattern and being selected from: personal relationship changes of the user; employment changes of the user or a family member of the user or a person living with the user; residence changes of the user or a family member of the user or a person living with the user; new purchases that exceed a predefined threshold purchase amount; and new purchases that require multiple payments over time, wherein monitoring the user's behavior over the period of time in connection with the one or more predefined triggering events includes to:

collect a plurality of location data blocks over the period of time, each respective location data block of the plurality of location data blocks storing the user's physical location at a respective point in time based on monitoring a plurality of positioning devices to track a mobile device associated with the user over the period of time based on proximity of the mobile device associated with the user to one or more of the plurality of positioning devices; and assign, to each respective location data block, a respective relevance value indicating a predictive value of the respective location data block in connection with at least one of the one or more predefined triggering events;

infer, based on data collected from the monitoring, an occurrence of at least one of the one or more predefined triggering events;

notify the user of the at least one inferred triggering event;

invite the user to take one or more financial actions related to the at least one inferred triggering event; and in response to a selection of the user to take at least one of the one or more financial actions, execute at least one of the one or more financial actions.

17. The non-transitory computer-readable data storage medium of claim 16, wherein the one or more financial actions are selected from: changing information regarding one or more financial accounts of the user; setting up automatic bill payments; sharing bill payments; and opening one or more financial accounts.

18. The non-transitory computer-readable data storage medium of claim 16, wherein the one or more financial actions the user is invited to take are determined partially based on information received from the user about the at least one inferred triggering event after the user is notified about the at least one inferred triggering event.

19. The non-transitory computer-readable data storage medium of claim 16, wherein the relevance values have a value between a negative number and a positive number.

20. The non-transitory computer-readable data storage medium of claim 16, wherein the inferring of a first of the at least one triggering event occurs when a sum of relevance values of the data blocks collected in connection with the first of the at least one triggering event meets or exceeds a predefined threshold relevance value.

* * * * *